United States Patent [19]
Gerwin et al.

[11] Patent Number: 5,978,434
[45] Date of Patent: Nov. 2, 1999

[54] PEBBLE BED REACTOR

[75] Inventors: Helmut Gerwin; Winfried Scherer, both of Jülich, Germany

[73] Assignee: Forschungszentrum Jülich GmbH, Jülich, Germany

[21] Appl. No.: 09/091,067

[22] PCT Filed: Dec. 6, 1996

[86] PCT No.: PCT/DE96/02365

§ 371 Date: Jun. 9, 1998

§ 102(e) Date: Jun. 9, 1998

[87] PCT Pub. No.: WO97/22973

PCT Pub. Date: Jun. 26, 1997

[30] Foreign Application Priority Data

Dec. 20, 1995 [DE] Germany .......................... 195 47 652

[51] Int. Cl.⁶ ........................................ G21C 1/07
[52] U.S. Cl. ........................................ 376/381
[58] Field of Search ........................ 376/381, 265

[56] References Cited

U.S. PATENT DOCUMENTS

| | | | |
|---|---|---|---|
| 3,398,051 | 8/1968 | Seltorp | 376/411 |
| 3,420,738 | 1/1969 | Grant | 376/411 |
| 3,481,831 | 12/1969 | Grant | 376/261 |
| 4,382,908 | 5/1983 | Petersen | 376/381 |
| 4,642,214 | 2/1987 | Zhong | 376/381 |
| 4,863,676 | 9/1989 | Helm | 376/381 |

FOREIGN PATENT DOCUMENTS

| | | |
|---|---|---|
| 643 463 | 2/1964 | Belgium . |
| 81 778 | 6/1983 | European Pat. Off. . |
| 1 464 740 | 9/1969 | Germany . |
| 1 789 072 | 1/1971 | Germany . |

*Primary Examiner*—Daniel D. Wasil
*Attorney, Agent, or Firm*—Frishauf, Holtz, Goodman, Langer & Chick, P.C.

[57] ABSTRACT

The invention relates to a pebble bed reactor comprising a core cavity filled with spherical fuel elements and bounded by reflector material. Spherical fuel elements pass through the core cavity under the effect of gravity. Coolant gas flows through the core cavity in a descending or ascending stream. The coolant-gas lines provided for the purpose discharge laterally above the base of the cavity bottom. In the reactor according to the invention, coolant gas can be conveyed through the pile of fuel elements without problems over long operating times.

10 Claims, 3 Drawing Sheets

PEBBLE BED REACTOR

BACKGROUND OF THE INVENTION

1. Field of the Invention

The invention relates to a pebble bed reactor comprising a core cavity which is filled with spherical fuel elements and bounded by reflector material, and through which spherical fuel elements pass under the effect of gravity and coolant gas flows in a descending or ascending stream.

2. Background Information

Pebble bed reactors are known. For example, a pebble bed reactor with graphite core is described in DE 31 49 794 C1. In pebble bed reactors, a pile of spherical fuel elements known as the pebble bed passes under the effect of gravity through a core cavity bounded by reflector material. Control of the nuclear reactor is achieved by neutron absorbers, for example control rods, which either are moved in bores in the reflector material or are inserted directly into the pile of spherical fuel elements for reactor control.

To replace spent spherical fuel elements, which are removed from the core cavity, the pile is refilled. Pebble outlet tubes are usually provided at the bottom of the core cavity for removal of spherical fuel elements. The fuel elements are fed toward the pebble outlet tubes via funnel-shaped depressions in the bottom reflector. Larger core cavities or core cavities with a central column of graphite in the pebble bed are equipped with a plurality of pebble outlet tubes.

Usually a stream of coolant gas, especially helium, is passed vertically through the pile of fuel elements. The direction of flow of the coolant gas can be the same as that of the direction of movement of the spherical fuel elements in the gravity direction (descending flow), but the coolant gas can also flow through the core cavity counter to the direction of movement of the spherical fuel elements, or in other words upward (ascending flow). For supply and removal of coolant gas, the core cavity is provided in the top and bottom reflectors with coolant-gas inlet and outlet orifices, which usually discharge into respective gas plenums, which are used to make the gas stream uniform, and especially to equalize the temperature in the coolant gas.

As the spherical fuel elements move through in gravity direction, the spherical surfaces become abraded. It is even possible for fragments of spheres to be formed and to accumulate at the bottom of the core cavity. Fragments of spheres are formed in particular when control rods are inserted into the pile and moved in the pile. Such fragments of spheres are mainly removed from the core cavity via the pebble outlet tubes, but they can also stick in the gas penetrations in the bottom reflector and cause fouling. In such cases, the coolant-gas flow can be greatly impaired.

SUMMARY OF THE INVENTION

The object of the invention is to ensure, for pebble bed reactors, that coolant gas can be conveyed through the pile of fuel elements in the core cavity without problems even over long operating times.

This object is achieved in a pebble bed reactor of the present invention. Accordingly, the connections for the coolant-gas lines for supply and removal of coolant gas in the core cavity are attached laterally above the cavity bottom. The coolant gas therefore flows laterally above the cavity bottom, into or out of the core cavity depending on whether the flow is ascending or descending. Lumps broken off from the spherical fuel elements cannot enter such lateral orifices.

If a bowl-shaped or funnel-shaped structure of the cavity bottom is provided for removal of the spherical fuel elements, or if the cavity bottom is provided with a plurality of bowl-shaped or funnel-shaped structures disposed next to each other, it is provided in an advantageous embodiment of the invention that the coolant-gas lines discharge in at least two levels disposed one above the other in the bowl or funnel walls. Preferably, according to another embodiment of the present invention, the coolant-gas lines run horizontally in the reflector wall.

According to a further embodiment of the present invention, when a central column is disposed in the core cavity, the coolant-gas lines are advantageously routed inside the central column, using the existing space enclosed by the central column, and discharge in the region of the wall of the central column. In order to ensure, when the coolant gas is conveyed in this way, that coolant gas flows around all fuel elements until they ester the pebble outlet tubes, the pebble outlets are expediently disposed according to an additional embodiment of the present invention in a bottom region, close to the central column, in the cavity bottom.

Brief Description of the Drawing

The invention with its features will be explained in more detail hereinafter by means of practical examples. The drawing comprises individual figures wherein.

Detailed Description of the Invention

Figure 1:
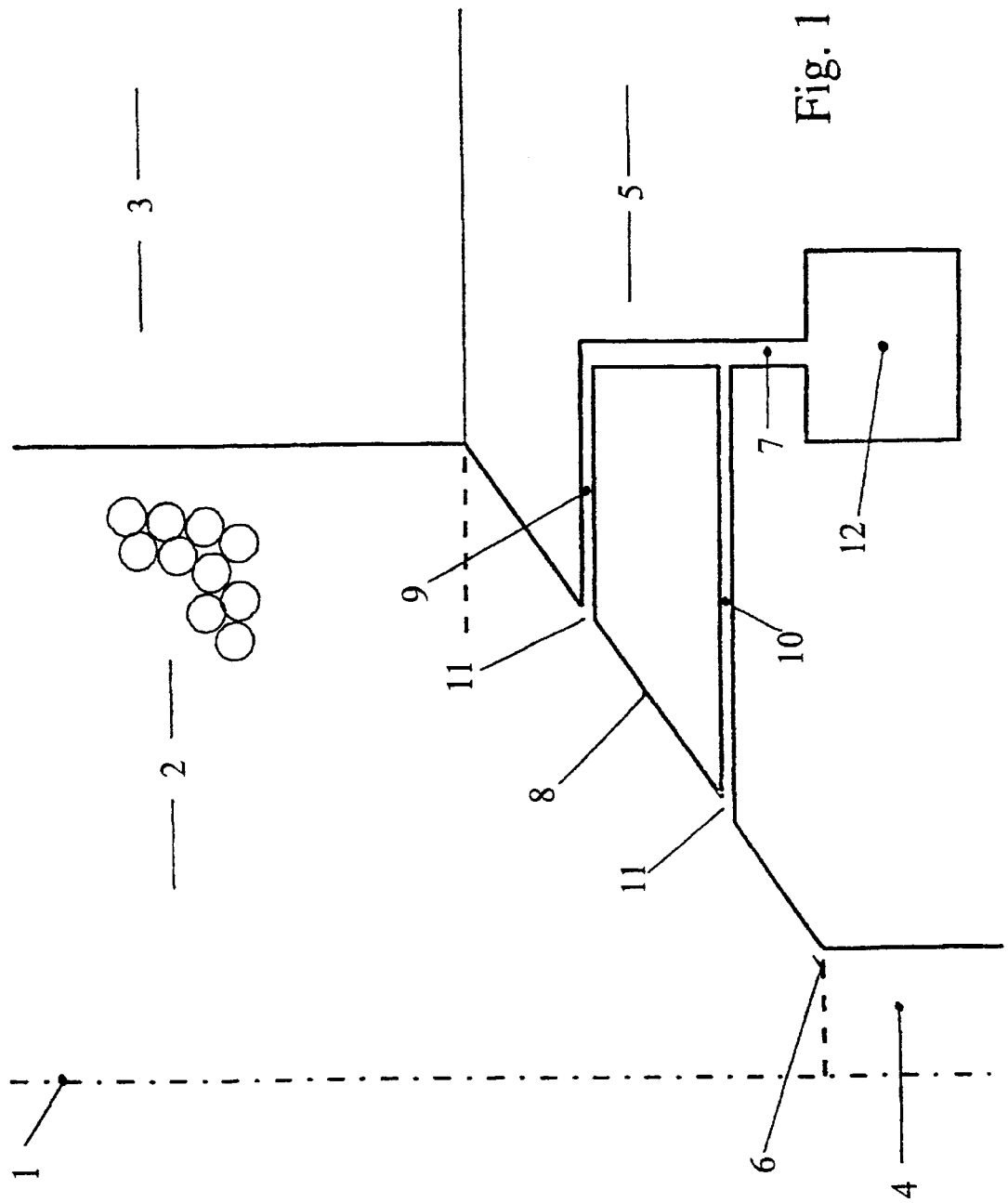
FIG. 1 shows a half-section view of a pebble bed reactor with funnel-shaped cavity bottom and coolant-gas lines discharging at a plurality of levels.

FIG. 1 schematically illustrates a half-section view of the lower region of a cylindrical core cavity with cylinder axis 1, with a pile 2 of spherical fuel elements, otherwise known as the pebble bed, which is merely hinted at in FIG. 1 and the other figures of the drawing, with reflector 3 surrounding the pile 2 and with a pebble outlet 4 in the cavity bottom 5. In the practical example, the cavity bottom 5 is provided with a funnel-shaped internal space, wherein the apex of the funnel feeds toward the base 6 of the cavity bottom 5 and discharges at pebble outlet 4. Inside the walls of cavity bottom 5 there run coolant-gas conduits 7, which discharge in a plurality of levels—in the practical example in two levels disposed one vertically above the other—in the funnel-shaped internal space of cavity bottom 5, at the inside wall 8 thereof. FIG. 1 schematically illustrates two branch lines 9, 10 of coolant-gas conduit 7, through which the coolant gas is passed via orifices 11 into the pile 2 of spherical fuel elements in the funnel of the cavity bottom. In the practical example, the coolant gas flows through the core cavity in ascending direction, or in other words counter to the direction of movement of the spherical fuel elements under the effect of gravity.

The coolant gas flows into coolant-gas conduit 7 from an upstream gas plenum 12. A plurality of coolant-gas conduits 7 with branch lines 9, 10 discharging in the funnel-shaped internal space of cavity bottom 5 is attached to gas plenum 12, which is disposed in the form of an annulus around cylinder axis 1, a large number of coolant-gas conduits being provided in the practical example. FIG. 1 and the other FIGS. 2 and 3 each show only one of these coolant-gas conduits. The gas supply to gas plenum 12 is not illustrated in the figures of the drawing.

Figure 2:
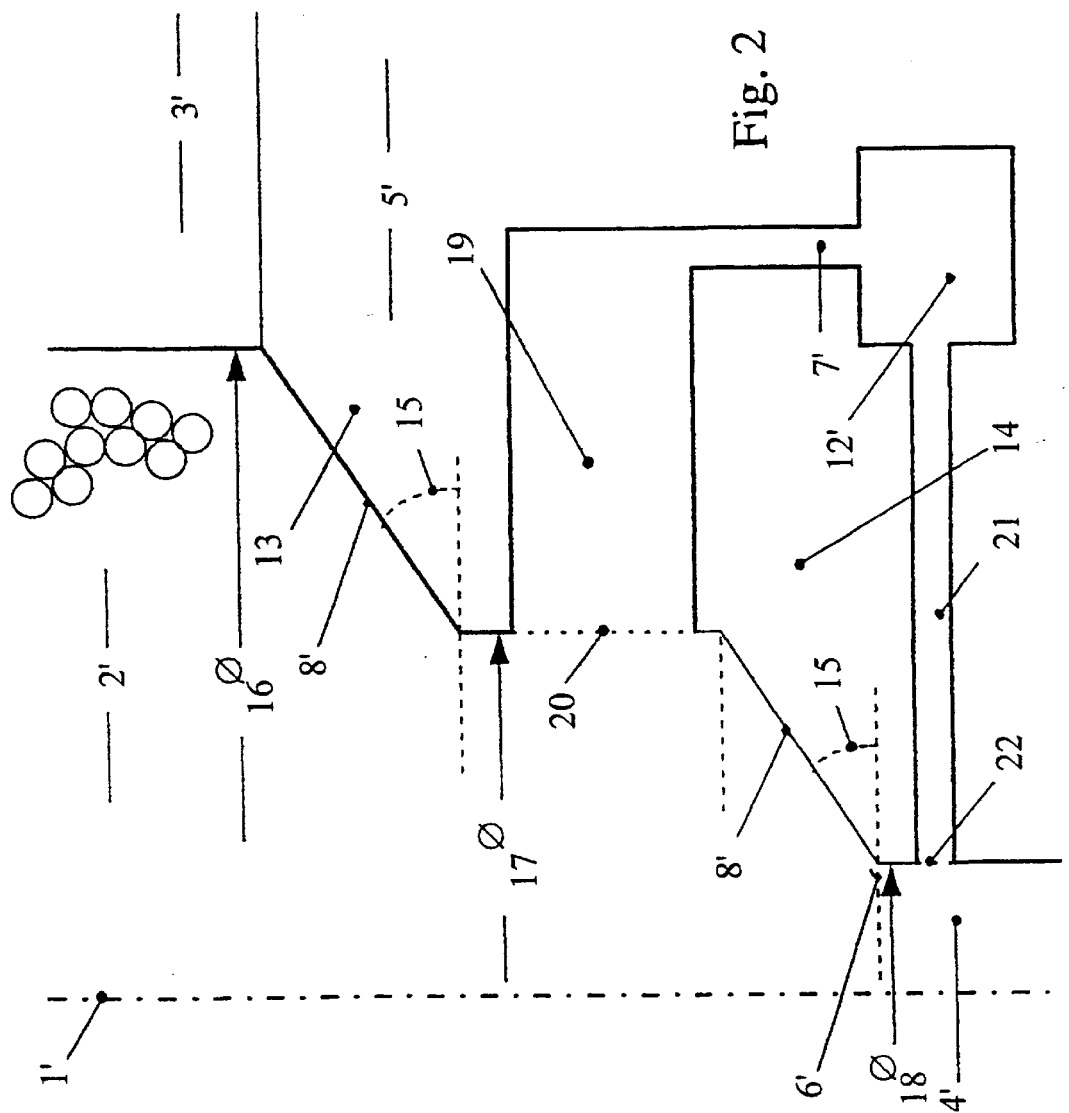
FIG. 2 shows a half-section view of a variant of a pebble bed reactor according to FIG. 1.

A variant of the core cavity according to FIG. 1 is shown in FIG. 2. Those design features of the core cavity according to FIG. 2 which correspond to the features of FIG. 1 are marked in FIG. 2 with the same reference symbols as in FIG. 1, but are supplemented by a prime character; for example, the cylinder axis is denoted by "1" in FIG. 1 and by "1'" in FIG. 2.

In the practical example according to FIG. 2, the funnel-shaped internal space of cavity bottom 5' is divided into two truncated-cone sections 13, 14 disposed one above the other, of which the upper truncated-cone section 13 is provided with a cone angle 15 identical to that of the lower truncated-cone section 14 and with a cone-base diameter 16 at its upper cone end which—for connection to the internal space of the core cavity—is identical to the outside diameter of the internal space of the core cavity containing the pile 2 of spherical fuel elements. At its upper cone end, the lower truncated-cone section 14 is provided with a cone-base diameter 17 which corresponds to the truncated-cone diameter of truncated-cone section 13 at the lower truncated-cone end thereof, and so the truncated-cone sections 13, 14 are disposed flush with each other. The lower truncated-cone section 14 feeds toward the pebble outlet 4', and its truncated-cone diameter at the lower truncated-cone end therefore corresponds to the diameter 18 of the pebble outlet 4'.

Between the truncated-cone sections 13, 14 there is disposed an upper branch line 19, which is attached to the coolant-gas conduit 7', with vertical orifices 20 for outflow of the coolant gas into the funnel-shaped internal space of cavity bottom 5'. A lower branch line 21 for conveying coolant-gas runs underneath the lower truncated-cone part 14 and discharges with vertical orifices 22 at the funnel apex of cavity bottom 5' directly into pebble outlet 4'. The coolant gas flows—as already shown in the practical example according to FIG. 1—from a gas plenum 12' into coolant-gas conduit 7' and lower branch line 21. A plurality of coolant-gas conduits 7' is attached to gas plenum 12' but, as in FIG. 1, only one of such coolant-gas conduits is illustrated in FIG. 2.

The funnel-shaped internal space of cavity bottom 5' according to FIG. 2 therefore comprises a funnel divided horizontally into two truncated-cone sections 13, 14, wherein the truncated-cone sections are disposed one above the other and between them there is disposed a cylindrical part with orifices 20 for the upper branch line 19, as well as of a cylindrically tapered funnel apex, which discharges into pebble outlet 4' and is provided in the discharge region with the orifices 22 of the lower branch lines 21. Such a design is suitable in particular for a core cavity with sufficiently low pressure loss during flow of the coolant gas through the pebble bed. By virtue of the horizontally running coolant-gas conduits with orifices 20, 22 oriented vertically in the cylindrical parts, or in other words parallel to the direction of movement of the spherical fuel elements, fouling of the coolant-gas supply conduits and of their branch lines is prevented.

Figure 3:
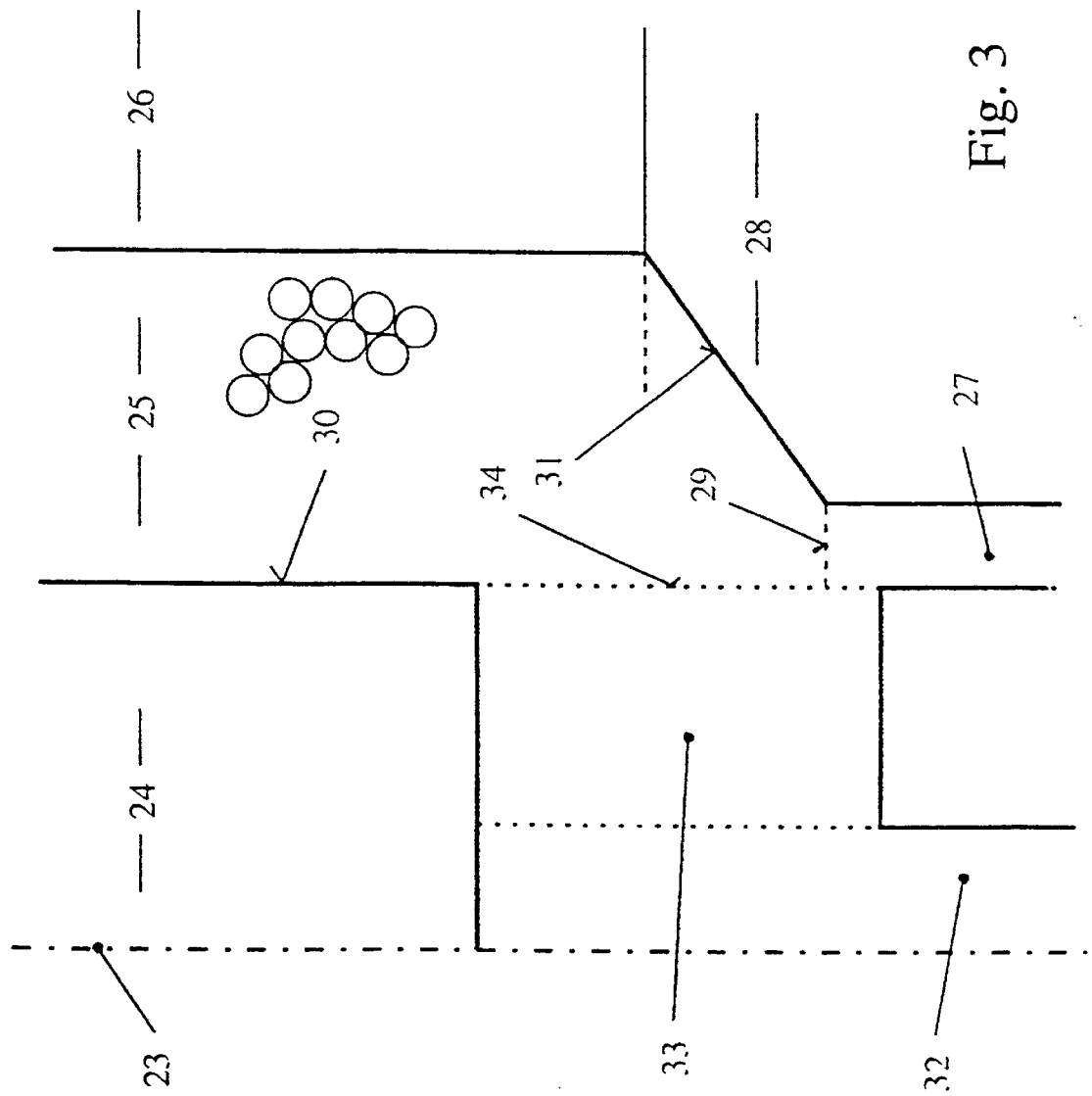
FIG. 3 shows a half-section view of a pebble bed reactor with a central column.

For pebble bed reactors with higher power in the pile of pebbles, it is intended that a central column will be disposed in the core cavity and the spherical fuel elements will be spread in the form of an annulus around the central column. For such a pebble bed reactor, FIG. 3 shows a coolant-gas supply corresponding to the invention laterally above the base of the cavity bottom. FIG. 3 in turn schematically shows, as in FIGS. 1 and 2, a half-section view of the lower region of a cylindrical core cavity with cylinder axis 23, with a central column 24, with a pile 25 of annular cross section containing spherical fuel elements spread around the central column 24, with reflector 26 surrounding pile 25 and with pebble outlets 27, only one of which pebble outlets is illustrated in FIG. 3. The pebble outlets extend in the cavity bottom 28 from the base 29 thereof, are disposed in the form of an annulus around the cylinder axis 23 underneath pile 25 of spherical fuel elements and are located in a bottom region, on the base 29 of cavity bottom 28, close to the outside wall 30 of central column 24.

In the practical example, cavity bottom 28 is provided with a funnel-shaped inside wall 31, via which the spherical fuel elements are fed toward pebble outlets 27 in cavity bottom 28.

A coolant-gas supply conduit 32 is disposed centrally in central column 24. Coolant-gas supply conduit 32 is provided with branch lines 33, which are routed horizontally through the wall of central column 24 and discharge with vertically oriented discharge orifices 34, which are shaped as holes or slits and are not illustrated in FIG. 3, into pile 25 of spherical fuel elements. The coolant gas flows into the pebble bed in a region in which the spherical fuel elements are located upstream from pebble outlets 27, just before they exit the core cavity.

When the coolant gas is conveyed in this way with ascending or descending flow of coolant gas in the pebble bed, the following advantages are obtained:

The coolant gas flowing in the pebble bed along the outside wall of the central column, and therefore in a zone in which the greatest power density exists, is provided with a particularly short path through the pile of spherical fuel elements.

The coolant gas flowing along the inside wall of the outer reflector is forced to take the longest path through the pile of spherical fuel elements, so that it can become heated sufficiently even while flowing through zones of low power density in the pebble bed.

The internal region of the central column can be used advantageously for accommodating the gas plenums, or in other words the hot-gas or cold-gas chambers. In the case of ascending flow of coolant gas, the cold-gas chamber is disposed in the lower region of the central column and the hot-gas chamber in the upper region. The positions of the chambers in the central column are reversed for the case of descending flow.

The cavity bottom, which functions as the bottom reflector, does not contain any orifices other than the pebble outlets and can be shaped with a smooth surface and as a massive structural component with better reflector and shield effect combined with low construction (which is also possible because the gas plenums are no longer necessary here).

In the case of descending flow, the hot gas can be conveyed by simple means from the lower gas plenum in the central column to the steam generators or heat exchangers. Furthermore, good intermixing of the heated coolant gas can be achieved.

In a pebble bed high temperature reactor corresponding to the prior art, with central column and a thermal capacity of 400 MW, in which the coolant gas is introduced as an ascending flow through orifices in the base of the cavity bottom into the pile of spherical fuel elements, the differences in outlet temperature of the coolant gas emerging from the core cavity exceed 150° C. Such temperature differences are reduced to smaller than 10° C when the pebble outlets are disposed along the wall of the central column and the coolant gas flows into the pebble bed via the central column and slits, which are disposed at the lower end of the central column and extend over 30% of the length of the central column. A further reduction of outlet temperature differences could be achieved with a hole percentage varying over the height of the central column, wherein the greater portion of the coolant-gas flow is introduced into the pebble bed in the region above the pebble outlets.

Reference Symbol List

| | |
|---|---|
| Cylinder axis | 1, 1' |
| Bed of spherical fuel elements | 2, 2' |
| Reflector | 3, 3' |
| Pebble outlet | 4, 4' |
| Cavity bottom | 5, 5' |
| Base | 6, 6' |
| Coolant-gas conduit | 7, 7' |
| Inside wall | 8, 8' |
| Branch line | 9, 10 |
| Orifices | 11 |
| Gas plenum | 12, 12' |
| Truncated-cone section | 13, 14 |
| Cone angle | 15 |
| Cone-base diameter | 16, 17 |
| Diameter of the pebble outlet | 18 |
| Branch line | 19 |
| Orifices | 20 |
| Branch line | 21 |
| Orifices | 22 |
| Cylinder axis | 23 |
| Central column | 24 |
| Bed of spherical fuel elements | 25 |
| Reflector | 26 |
| Pebble outlet | 27 |
| Cavity bottom | 28 |
| Base | 29 |
| Wall of the central column | 30 |
| Inside wall | 31 |
| Coolant-gas supply conduit | 32 |
| Branch line | 33 |
| Discharge orifice | 34 |

What is claimed:

1. A pebble bed reactor comprising:
a core cavity which is filled with spherical fuel elements to form a pebble bed and is bounded by reflector material to form a reflector wall, and through which spherical fuel elements pass under the effect of gravity and coolant gas flows in a descending or ascending stream,
a cavity bottom disposed at a bottom portion of the core cavity and having a base,
at least one pebble outlet disposed adjacent to the base, and
a plurality of coolant-gas lines which are provided for removal of downwardly flowing coolant gas and supply of upwardly flowing coolant gas, at least one of said coolant-gas lines discharge directly into the pebble bed of the core cavity laterally above the base in a horizontal orientation and adjacent to the pebble outlet.

2. The pebble bed reactor according to claim 1, wherein the cavity bottom has a bowl-shape or a funnel-shape or comprises a plurality of bowl-shaped or funnel-shaped structures, to form a bowl-shaped or a funnel shaped wall, and the coolant-gas lines discharge into at least two levels one above the other, in the bowl-shaped wall or the funnel-shaped wall.

3. A pebble bed reactor comprising:
a core cavity which is filled with spherical fuel elements and is bounded by reflector material to form a reflector wall, and through which spherical fuel elements pass under the effect of gravity and coolant gas flows in a descending or ascending stream,
a cavity bottom disposed at a bottom portion of the core cavity and having a base,
coolant-gas lines which are provided for removal and supply of coolant gas, said coolant-gas lines discharge into the core cavity laterally above the base, and
a central column having a wall, said central column being disposed in the core cavity, the coolant-gas lines being routed in the core cavity inside the central column and discharge into a region of the wall of the central column.

4. The pebble bed reactor according to claim 3, which further comprises pebble outlets provided for the spherical fuel elements, said pebble outlets being disposed in the cavity bottom in a bottom region adjacent to the central column.

5. The pebble bed reactor according to claim 3, wherein the cavity bottom has a bowl-shape or a funnel-shape or comprises a plurality of bowl-shaped or funnel-shaped structures, to form a bowl-shaped or a funnel-shaped wall, and the coolant-gas lines discharge into at least two levels, one level disposed above the other level, in the bowl-shaped wall or the funnel-shaped wall.

6. The pebble bed reactor according to claim 3, wherein the coolant-gas lines run horizontally with respect of the reflector wall.

7. The pebble bed reactor according to claim 5, wherein the coolant-gas lines run horizontally with respect of the reflector wall.

8. The pebble bed reactor according to claim 4, wherein the cavity bottom has a bowl-shape or a funnel-shape or comprises a plurality of bowl-shaped or funnel-shaped structures, to form a bowl-shaped or a funnel-shaped wall, and the coolant-gas lines discharge into at least two levels, one level disposed above the other level, in the bowl-shaped wall or the funnel-shaped wall.

9. The pebble bed reactor according to claim 4, wherein the coolant-gas lines run horizontally with respect of the reflector wall.

10. The pebble bed reactor according to claim 8, wherein the coolant-gas lines run horizontally with respect of the reflector wall.

\* \* \* \* \*